United States Patent [19]

Nakamura et al.

[11] 4,149,378
[45] Apr. 17, 1979

[54] EXHAUST SYSTEM AFFECTING SUCTION OF SECONDARY AIR BY USE OF LARGER CONNECTOR PIPE

[75] Inventors: Iwao Nakamura; Hiroyasu Kan, both of Yokohama, Japan

[73] Assignee: Nissan Motor Company, Limited, Japan

[21] Appl. No.: 720,819

[22] Filed: Sep. 7, 1976

[30] Foreign Application Priority Data

Sep. 11, 1975 [JP] Japan .................. 50/110394

[51] Int. Cl.² .......................................... F02B 75/10
[52] U.S. Cl. ........................................ 60/293; 60/305; 60/312
[58] Field of Search ............... 60/293, 312, 305, 319, 60/306, 314, 304; 123/65 E

[56] References Cited

U.S. PATENT DOCUMENTS

| | | | |
|---|---|---|---|
| 2,829,731 | 4/1958 | Clayton | 60/303 |
| 3,064,417 | 11/1962 | Tryhorn et al. | 60/312 |
| 3,170,280 | 2/1965 | Rees | 60/303 |
| 3,254,484 | 6/1960 | Kopper | 60/312 |
| 3,662,541 | 5/1972 | Sawada et al. | 60/293 |
| 3,946,558 | 3/1976 | Beekhuis | 60/282 |
| 3,979,905 | 9/1976 | Masaki et al. | 60/303 |

FOREIGN PATENT DOCUMENTS 461757 2/1937 United Kingdom ............... 60/312

OTHER PUBLICATIONS

Smith, *Exhaust and Intake Systems*, G. T. Foulis & Co., London, 1963, p. 106.
Annand et al., *Gas Flow in the I.C.E.*, G. T. Foulis & Co., London, 1974, pp. 96–97, 103.

*Primary Examiner*—Carlton R. Croyle
*Assistant Examiner*—Thomas I. Ross
*Attorney, Agent, or Firm*—Robert E. Burns; Emmanuel J. Lobato; Bruce L. Adams

[57] ABSTRACT

An exhaust line including an exhaust pipe assembly, a reactor for oxidizing hydrocarbons and carbon monoxide, a main muffler and a mechanism for drawing secondary air from the atmosphere into the exhaust line upstream of the reactor based on the pulsation of the exhaust pressure, wherein a front tube of the exhaust pipe assembly for passing the exhaust gas from the engine to the reactor has a smaller cross-sectional area than a center tube connecting the reactor to the main muffler, so that the pulsation is of a great magnitude even at an engine speed where the pulsation is in an anti-resonance state.

1 Claim, 6 Drawing Figures

EXHAUST SYSTEM AFFECTING SUCTION OF SECONDARY AIR BY USE OF LARGER CONNECTOR PIPE

BACKGROUND OF THE INVENTION

This invention relates to an exhaust line of an automotive internal combustion engine, which exhaust line has an exhaust pipe assembly and an air supply circuit to supply secondary air to the exhaust gas from the atmosphere based on the pulsation of the exhaust pressure.

In the field of automotive internal combustion engines, it is known to supply secondary air to the exhaust gas for accomplishing the removal of unburned hydrocarbons and carbon monoxide from the exhaust gas by after-burning or oxidation of these substances. Among known secondary air supply mechanisms for this purpose, there is a mechanism which utilizes the pulsation of the exhaust pressure in the exhaust line as a fundamental factor in drawing air into the exhaust line from the atmosphere.

BRIEF DESCRIPTION OF THE DRAWINGS

In the accompanying drawings.

DESCRIPTION OF THE PREFERRED EMBODIMENT

Figure 1:
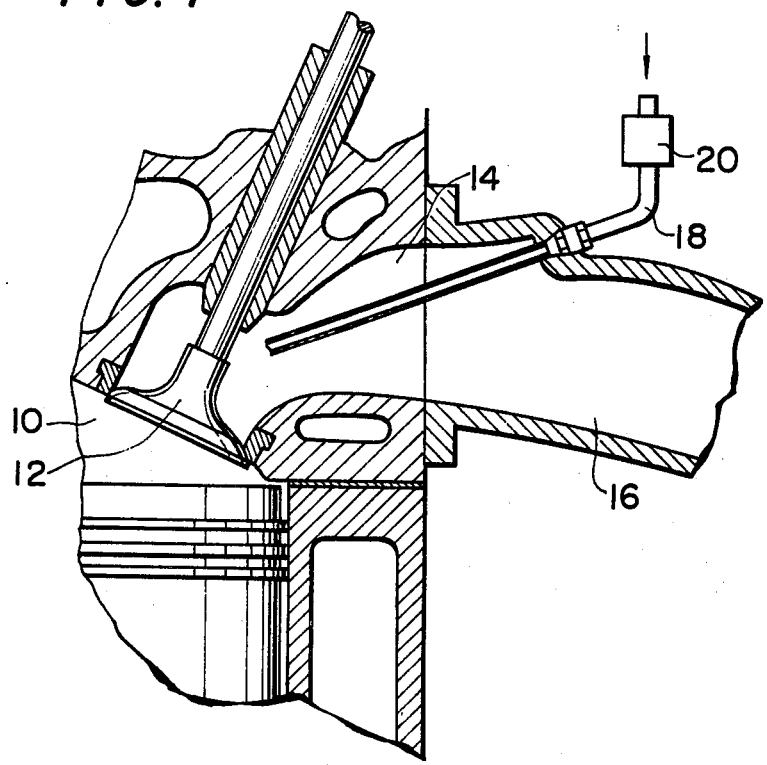
FIG. 1 is a fragmentary and sectional elevation of a conventional exhaust line, including a secondary air supply mechanism, of an automotive internal combustion engine.

FIG. 1 shows the construction of the aforementioned secondary air supply circuit. A combustion chamber of an internal combustion engine is indicated at 10, and an exhaust valve 12 governs the communication of the combustion chamber 10 with an exhaust port 14 in the usual manner. The exhaust port 14 is connected to an exhaust manifold 16. The secondary air supply circuit consists of an air conduit 18 which opens into the exhaust port 14 (or alternatively into the exhaust manifold 16) and a check valve 20 such as a reed valve arranged to govern the admission of air into the conduit 18 from the atmosphere. In the exhaust port 14, a positive pressure and a negative pressure are created alternately as the exhaust valve 12 is opened and closed. The lead valve 20 remains closed and prevents the exhaust gas from being discharged through the conduit 18 while a positive pressure is established in the exhaust port 14 but allows the atmospheric air to be drawn into the exhaust port 14 when a negative pressure is established in the exhaust port 14.

This secondary air supply circuit has the advantage of not needing the provision of any air pump. However, the quantity of the secondary air supplied by this circuit cannot be sufficiently large unless a negative pressure created in the exhaust port 14 is of a sufficiently large magnitude. The magnitude of this negative pressure is dependent on the magnitude of the pulsation of the exhaust pressure in the exhaust port 14, that is, the difference between a peak value of a positive pressure and a peak value of a negative pressure in the exhaust line of the engine. The magnitude of the pulsation of the exhaust pressure is of course dependent on the engine speed. In conventional exhaust lines of automotive internal combustion engines, the magnitude of the pulsation of the exhaust pressure is not always large enough to allow the supply of the secondary air in a desirable quantity. We have recognized that the magnitude of the pressure fluctuation in the exhaust line is significantly affected by the vibration characteristic of the exhaust line and hence the construction of the exhaust line. Besides, we have discovered that the quantity of the secondary air supplied by the above described circuit can be increased by constructing the exhaust pipe assembly of the exhaust line in a unique manner.

With respect to an exhaust line of an automotive internal combustion engine, which exhaust line is provided with a secondary air supply mechanism based on the pulsation of the exhaust pressure in the exhaust line and includes a front tube as a portion nearest to the engine of an exhaust pipe assembly, a reactor, which may be a premuffler or a catalytic converter, for converting noxious components of the exhaust gas into harmless substances, attached to the end of the front tube, a center tube as another portion of the exhaust pipe assembly connecting the premuffler to a main muffler, it is an object of the present invention to provide an improved construction of the exhaust pipe assembly, which construction brings about an augmented fluctuation of the exhaust pressure in the exhaust line and is very easy to realize.

According to the invention, the front tube of the exhaust pipe assembly is made to have an inner cross-sectional area smaller than the inner cross-sectional area of the center tube.

The relationship between the cross-sectional areas of the front and center tubes according to the invention is contrary to the relationship in conventional exhaust lines. An exhaust line according to the invention exhibits a vibration characteristic greatly different from a common vibration characteristic of conventional exhaust lines and causes a large magnitude of exhaust pressure fluctuation in the exhaust line even when the engine speed coincides with an anti-resonance frequency of an exhaust gas column in the exhaust line to the pulsation of the exhaust pressure.

The advantages of the invention will become apparent from the following detailed description.

Figure 2:
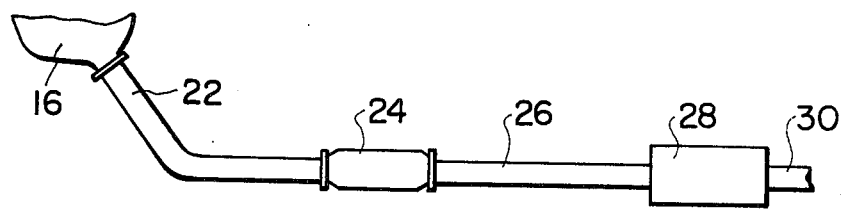
FIG. 2 is a schematic view of an exhaust line of an automotive internal combustion engine.

An exhaust line of an automotive internal combustion engine herein concerned with has a general construction downstream of the exhaust port 14 as shown in FIG. 2. A front tube 22 of an exhaust pipe assembly connects the outlet of the exhaust manifold 16 to the inlet of a catalytic reactor 24 which may contain therein a catalyst for the oxidation of hydrocarbons and carbon monoxide. The reactor 24 may be replaced by a premuffler. The reactor or premuffler must allow exhaust gas to pass therethrough without destroying pulsations of the exhaust gas pressure as later herein explained. A center tube 26 of the exhaust pipe assembly connects the outlet of the reactor 24 to the inlet of a main muffler 28, and a tail tube 30 is arranged to discharge the exhaust gas from the main muffler 28 into the atmosphere.

Figure 3:
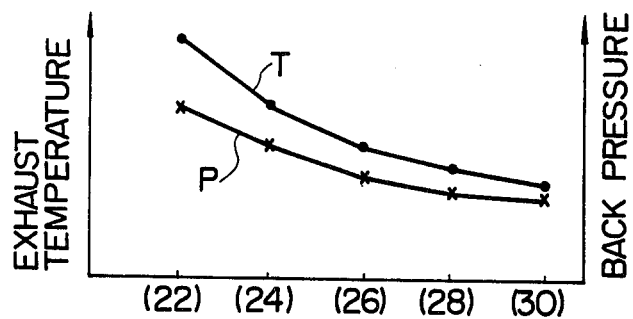
FIG. 3 is a graph showing the temperature profile and back pressure profile in the exhaust line of FIG. 2.

The exhaust gas exhibits a temperature profile in the exhaust line of FIG. 2 as represented by the curve T in FIG. 3, wherein the numerals (22), (24), (26), (28) and (30) on the abscissa respectively indicate the entrance to the front tube 22, the reactor 24, the entrance to the center tube 26, the entrance to the main muffler 28 and the exit of the tail tube 30. The exhaust temperature in the exhaust line is highest in the exhaust port 14 and gradually lowers as the exhaust gas passes through the exhaust line. Since the volume of the exhaust gas decreases as the temperature lowers, the back pressure (as a mean value of the momentarily fluctuating exhaust pressure) in the exhaust line shows a profile as represented by the curve P in FIG. 3 if the exhaust line has a definite cross-sectional area. Since a rise in the back pressure is unfavorable to the output power of the engine, it is a rule in conventional exhaust lines that the front tube 22 has an inner cross-sectional area larger than the inner cross-sectional area of the center tube 26 and that the tail tube 30 has a smaller inner cross-sectional area than the center tube 26.

The characteristic of the vibration of a gas column in the exhaust line is variable depending on the construction of the exhaust line. The vibration of the gas column exhibits resonance to the above dedescribed pulsation of the exhaust pressure at certain frequencies. Both the resonance frequencies at which the magnitude of the fluctuation of the exhaust pressure becomes maximal and anti-resonance frequencies at which the magnitude of the exhaust pressure fluctuation becomes minimal are determined by the construction of the exhaust line.

The frequency of the pulsation of the exhaust pressure is proportional to the number of the revolutions of the engine per second (the proportional constant is 2 for four-cycle four-cylinder engines and 3 for four-cycle six-cylinder engines). If anti-resonance of the gas column vibration to the pulsation of the exhaust pressure occurs at a frequency in a range corresponding to a most frequently used or medium speed range of the engine (for example, a frequency range from 50 to 100 Hz corresponds to an engine speed range from 1500 to 3000 rpm for four-cycle four-cylinder engines), the secondary air is supplied to the exhaust gas by the mechanism shown in FIG. 1 only in an insufficient quantity around a certain engine speed at which the anti-resonance occurs.

It is possible in principle to avoid the occurrence of the described anti-resonance within a normal or medium engine speed range by appropriately chosing the respective distances of the reactor 24 and the main muffler 28, which serve individually as a reflector to a pulsation wave, from the exhaust port 14. It is almost impossible in practice, however, to optionally determine the positions of the reactor 24 and the main muffler 28, because these two components are considerably voluminous and must be so located as to satisfy other various requirements of the overall vehicle design.

Even when the anti-resonance does not occur within a medium engine speed range, the quantity of the secondary air supplied by the mechanism based on the pulsation of the exhaust pressure is rather insufficient.

Figure 4A:
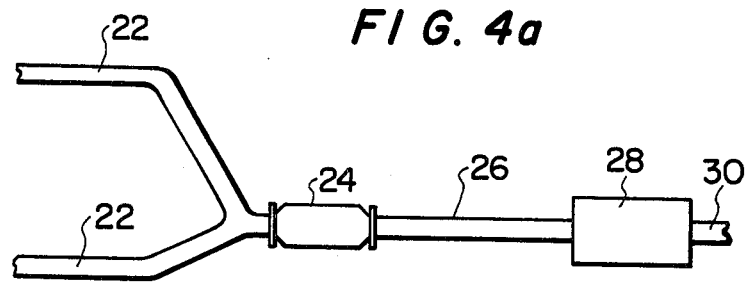
FIG. 4-a and FIG. 4-b are respectively schematic views of two exhaust lines which are fundamentally similar to the exhaust line of FIG. 2 but individually have a branched pipe construction.
Figure 4B:
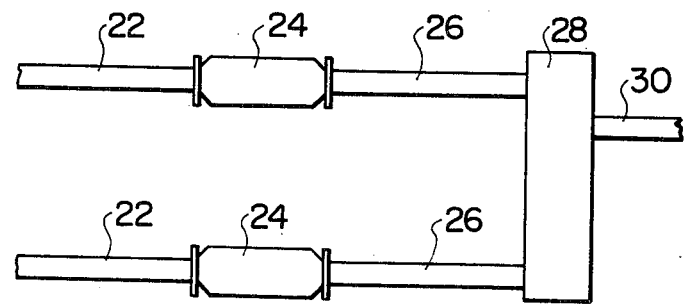

In an exhaust line according to the invention, neither the general construction as shown in FIG. 2 nor the respective lengths of the front tube 22 and the center tube 26 (i.e. the distances of the reactor 24 and the main muffler 28 from the exhaust port 14) has received any modification. Instead, the exhaust pipe assembly is made to have an inner cross-sectional area profile utterly different from that in conventional exhaust lines in order to vary the characteristic of the gas column vibration in the exhaust line. Contrary to the rule in conventional exhaust lines, the inner cross-sectional area of the front tube 22 is made smaller than the inner cross-sectional area of the center tube 26. When the front tube 22 and/or the center tube 26 have a branched configuration or resectively consist of two parallel tubes as exemplified by FIGS. 4-a and 4-b, the inner cross-sectional area of either the front tube 22 or rhe center tube 26 is defined as the total of the inner cross-sectional area of each of the branches or the parallel tubes.

Figure 5:
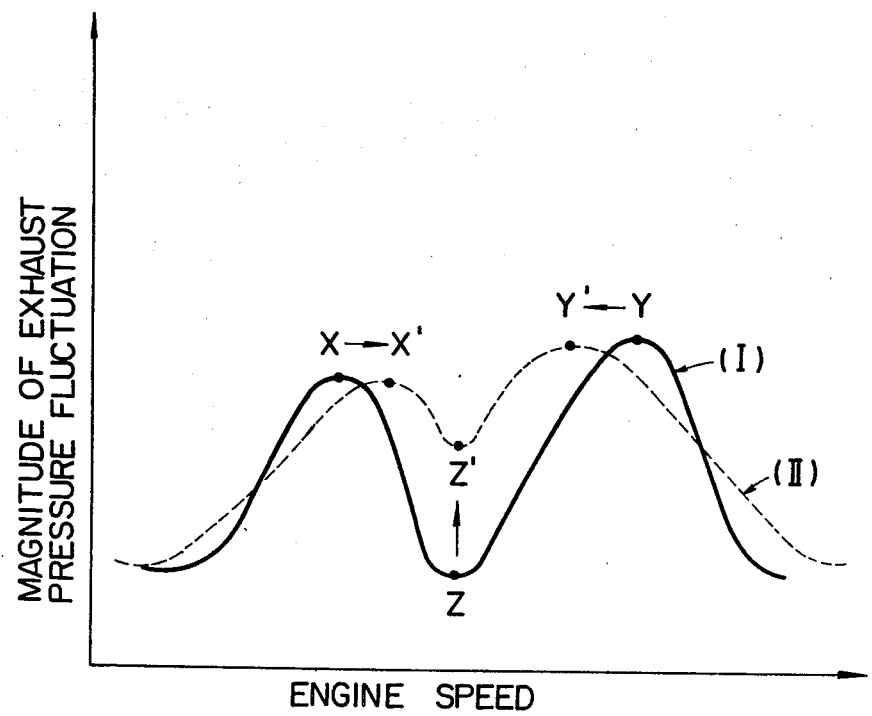
FIG. 5 is a graph showing variations in the magnitude of the fluctuation of the exhaust pressure within the exhaust line constructed as in FIG. 2 depending on the engine speed for two cases when the exhaust pipe assembly of the exhaust line is constructed in the usual manner and according to the invention, respectively.

The curve I of FIG. 5 represents the relationship between the magnitude of the fluctuation of the exhaust pressure in the exhaust line of FIG. 2, wherein the inner cross-sectional area of the front tube 22 is larger than the cross-sectional area of the center tube 26, and the engine speed. As seen, resonance occurs at X and Y, and anti-resonance is observed at Z between the two resonance frequencies X and Y. When the front tube 22 and the center tube 26 are replaced by differently thick ones to make the inner cross-sectional area of the front tube 22 smaller than the inner cross-sectional area of the center tube 26 without modifying the lengths of the respective tubes, the relationship between the magnitude of the pulsation and the engine speed so changes as to be represented by the curve II. In this case, resonance occurs at X' and Y' and anti-resonance at Z'. The curve II is different from the curve I in that the difference between the two resonance frequencies X' and Y' is noticeably smaller than the difference between the resonance frequencies X and Y on the curve I and that the magnitude of the pulsation at the anti-resonance point Z' is far greater than that at the anti-resonance point Z on the curve I. Besides, the magnitude of the pulsation on the curve II at engine speeds around the resonance frequencies X' and Y' is generally greater than that on the curve I around the resonance frequencies X and Y.

We have experimentally confirmed that the lower one (X or X') of the two resonance frequencies X and Y (or X' and Y') is determined mainly by a vibration of a gas column in the center tube 26 with the main muffler 28 as a spring in the vibration system, while the other (higher) resonance frequency Y or Y' is determined mainly by a vibration of a gas column in the front tube 22 with the reactor 24 as a spring. When the inner cross-sectional area of the front tube 22 is made smaller, the inertance (which corresponds to the inertial mass) of the gas column in the front tube 22 decreases and, hence, the resonance frequency lowers (from Y to Y'). By enlarging the inner cross-sectional area of the center tube 26, the inertance of the gas column in the center tube 26 increases, resulting in a rise in the resonance frequency (from X to X'). A favorably small difference between the two resonance frequencies X' and Y' can be realized not only by simultaneously decreasing the inner cross-sectional area of the front tube 22 and increasing the cross-sectional area of the center tube 26 in a conventional exhaust line but also by varying the cross-sectional area of either of the front tube 22 and the center tube 26 so long as the inner cross-sectional area of the front tube 22 is made comparatively smaller than that of the center tube 26.

Our experiments have revealed that the magnitude of the pulsation around the resonance frequencies X and Y cannot so satisfactorily be augmented as represented by the curve II by making the front tube 22 and the center tube 26 have the same inner cross-sectional area. It is necessary to make the inner cross-sectional area of the front tube 22 smaller than that of the center tube 26 for realizing a favorable vibration characteristic as represented by the curve II.

When the inner cross-sectional area of the front tube 22 is made smaller than that of the center tube 26, the back pressure rises to a certain extent and causes an increased amount of the combustion gas to remain unexhausted from the combustion chamber 10. However, some increase in the back pressure is not significantly unfavorable to the operation of the engine but is favorable to suppress the formation of nitrogen oxides in the combustion chamber 10 as will be understood from the fact that a portion of the exhaust gas is intentionally recirculated to the combustion chamber 10 in many of current internal combustion engines for minimizing the concentration of nitrogen oxides in the exhaust gas.

Thus, the present invention has accomplished the object of augmenting the magnitude of the pulsation of the exhaust pressure thereby to allow a simple air supply mechanism as shown in FIG. 1 to supply an increased quantity of secondary air to the exhaust gas by a modification of the exhaust pipe assembly which is quite easy to practice.

What is claimed is:

1. In an exhaust line of an automotive internal combustion engine, the exhaust line including an exhaust manifold, an exhaust pipe assembly, a catalytic reactor adapted to oxidize hydrocarbons and carbon monoxide contained in the exhaust gas of the engine and capable of transmitting pulsations of the exhaust gas pressure, a front tube as part of the exhaust pipe assembly arranged to pass the exhaust gas from the exhaust manifold to the reactor, a main muffler located downstream of the catalytic reactor, a center tube as part of the exhaust pipe assembly arranged to connect the catalytic reactor to the main muffler and a secondary air supply mechanism for drawing air from the atmosphere into the exhaust line upstream of the catalytic reactor based on the pulsation of the exhaust pressure in the exhaust line, the improvement comprising the front tube having over the entire length thereof an inner cross-sectional area substantially smaller than the inner cross-sectional area of the center tube.

* * * * *